US012541490B2

(12) United States Patent
Woldemichael et al.

(10) Patent No.: US 12,541,490 B2
(45) Date of Patent: Feb. 3, 2026

(54) SMART GATEKEEPER FOR DATA CERTAINTY

(71) Applicant: Bank of America Corporation, Charlotte, NC (US)

(72) Inventors: Desta Woldemichael, Charlotte, NC (US); Mary S. Roca, Mooresville, NC (US); Charles Dewayne Burhenn, Columbus, GA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/748,949

(22) Filed: Jun. 20, 2024

(65) Prior Publication Data

US 2025/0390475 A1 Dec. 25, 2025

(51) Int. Cl.
*G06F 16/20* (2019.01)
*G06F 9/46* (2006.01)
*G06F 16/215* (2019.01)
*G06F 16/23* (2019.01)
*G06F 16/25* (2019.01)
*G06F 21/56* (2013.01)

(52) U.S. Cl.
CPC ............ *G06F 16/215* (2019.01); *G06F 9/466* (2013.01); *G06F 16/2365* (2019.01); *G06F 16/258* (2019.01); *G06F 21/565* (2013.01); *G06F 2221/033* (2013.01)

(58) Field of Classification Search
None
See application file for complete search history.

(56) References Cited

U.S. PATENT DOCUMENTS

| 6,332,163 B1 * | 12/2001 | Bowman-Amuah ................. H04L 12/4604 719/329 |
| 6,629,148 B1 * | 9/2003 | Ahmed ................. H04L 67/101 709/239 |
| 6,904,449 B1 | 6/2005 | Quinones |
| 7,467,198 B2 | 12/2008 | Goodman et al. |
| 8,065,219 B2 | 11/2011 | Haynie et al. |

(Continued)

FOREIGN PATENT DOCUMENTS

| CA | 2260481 A1 | 7/1999 |
| JP | 2008511934 A | 4/2008 |

*Primary Examiner* — Jau Shya Meng
(74) *Attorney, Agent, or Firm* — Banner & Witcoff, Ltd.

(57) ABSTRACT

Systems and methods are disclosed for ensuring the integrity and security of data exchanges between mainframe systems and external channels. The invention includes a Data Distribution Service (DDS) that receives files from various channels and a Network Data Mover (NDM) that routes these files to a Gatekeeper Landing Zone (GK LZ) based on real-time server health and availability. A File Manager module detects new files, performs sanitization, converts files from EBCDIC to ASCII, and updates the Gatekeeper Control Database (GKC DB). The Validation module ensures data compliance, checks for duplicates, and logs exceptions. A Transaction Manager Resource Adapter (TMRA) splits data into transactions, identifies optimal processing paths, and converts data back to EBCDIC for transactions. The Reconciliation module verifies data accuracy and logs details, while the Backout module reverses transactions if discrepancies are found.

20 Claims, 5 Drawing Sheets

(56) References Cited

U.S. PATENT DOCUMENTS

| | | | |
|---|---|---|---|
| 8,468,244 B2* | 6/2013 | Redlich | G06Q 50/18 |
| | | | 715/255 |
| 2003/0014377 A1* | 1/2003 | Barson | H04M 3/533 |
| | | | 706/20 |
| 2006/0149840 A1* | 7/2006 | Thompson | H04L 67/55 |
| | | | 709/224 |
| 2015/0188949 A1* | 7/2015 | Mahaffey | H04W 12/37 |
| | | | 726/1 |
| 2020/0143469 A1 | 5/2020 | Stewart et al. | |
| 2023/0045247 A1* | 2/2023 | Talur | G06F 9/45558 |

* cited by examiner

SMART GATEKEEPER FOR DATA CERTAINTY

TECHNICAL FIELD

The present invention pertains to the technical field of error detection and correction, information security, multi-computer data transferring, and database and file management systems. Specifically, it involves a system and method for managing, validating, securing, and ensuring the integrity of data exchanges between a mainframe system and external channels. The invention addresses gaps in controls and monitoring, mitigates risks of data inconsistencies, duplicates, and errors, and provides enhanced capabilities for real-time monitoring, resiliency, recoverability, and research. By incorporating robust validation processes, intercept capabilities, and comprehensive monitoring tools, the invention aims to maintain data certainty and integrity, safeguard against malicious activities, and improve overall system reliability and efficiency.

DESCRIPTION OF THE RELATED ART

There are inherent limitations and vulnerabilities of in legacy mainframe data processing systems. Traditional mainframe data is delivered in a non-portable, platform-dependent, and rigid legacy format that is difficult to integrate with modern, dynamic data processing systems. This inflexibility creates significant challenges in ensuring data consistency and certainty across different platforms and systems. One major issue is that files are processed in the exact manner and location where they are delivered, which limits the ability to dynamically manage and route data based on current system health and availability. This rigidity also makes it difficult to handle large volumes of data efficiently, leading to potential bottlenecks and delays.

Data certainty is another critical issue in legacy systems. In traditional mainframe environments, data certainty and integrity are often embedded directly into the application code, making it non-transparent and non-transferable. This lack of transparency means that any changes or updates to the data processing logic require extensive modifications to the application code, which is both time-consuming and error-prone. Additionally, the rigid processing methods do not allow for flexibility in handling different types of data or adapting to new data requirements, which can lead to inconsistencies and errors, especially when dealing with large volumes of data.

One of the most significant problems in the current environment is the lack of resilience. Mainframe systems are typically designed for high availability and reliability, but they are not inherently resilient in terms of data processing. If a failure occurs, there is often no straightforward way to recover or continue processing without significant manual intervention. This lack of resiliency can lead to data loss, corruption, and prolonged downtime, which are unacceptable in today's fast-paced, always-on business environments. Furthermore, traditional mainframe systems are not well-equipped to handle data in real-time, leading to delays in data processing and reporting, which can affect decision-making and operational efficiency.

Data inconsistency is a prevalent issue due to the untimely and out-of-order processing of data. In legacy systems, data is often processed in batches, which means that there can be significant delays between the time data is generated and the time it is processed. This batch processing approach can result in data being processed out of order, leading to inconsistencies and inaccuracies in the data. For example, transactions might be recorded in the wrong sequence, causing errors in financial reporting and other critical business processes. These inconsistencies can be particularly problematic in environments where data accuracy and timeliness are crucial, such as in financial services, healthcare, and supply chain management.

The lack of data consistency and certainty also poses significant risks in terms of data security and compliance. Inconsistent and uncertain data can make it difficult to track and audit data flows, leading to potential security vulnerabilities and compliance issues. In industries that are heavily regulated, such as finance and healthcare, maintaining data integrity and compliance with regulatory requirements is critical. Traditional mainframe systems, with their lack of flexibility and transparency, make it challenging to implement and enforce robust data governance policies and procedures, increasing the risk of data breaches and non-compliance.

Another significant problem is the inability to efficiently manage and process large volumes of data from multiple sources. In a typical mainframe environment, data from various sources is often aggregated into large, unwieldy batch files that are difficult to process and manage. This aggregation can lead to inefficiencies and delays in data processing, as well as increased risk of data duplication and errors. Furthermore, the lack of standardized data formats and protocols can make it challenging to integrate data from different sources, leading to further inconsistencies and errors.

Traditional mainframe systems also lack the capability to provide real-time data processing and analytics. In today's fast-paced business environment, organizations need the ability to process and analyze data in real-time to make informed decisions and respond quickly to changing conditions. However, legacy systems are typically designed for batch processing, which means that data is processed in large chunks at scheduled intervals, rather than continuously in real-time. This limitation can result in outdated and incomplete data, which can affect decision-making and operational efficiency.

The problem of data duplication is another critical issue in legacy systems. Due to the lack of standardized data management practices and tools, it is common for data to be duplicated across different systems and applications. This duplication not only leads to increased storage and processing costs but also increases the risk of data inconsistencies and errors. Duplicate data can cause confusion and discrepancies in reporting and analytics, making it difficult to get a clear and accurate picture of business operations.

The lack of auditability and traceability in traditional mainframe systems is also a significant problem. In many legacy environments, there is no straightforward way to track and audit data flows, making it difficult to identify and address issues such as data corruption, unauthorized access, and compliance violations. This lack of visibility can lead to significant risks in terms of data security and regulatory compliance, as well as operational inefficiencies and increased costs.

The long-felt and unmet need for a solution like the present invention stems from the critical necessity to modernize and secure data processing in a way that is resilient, transparent, and adaptable. Organizations have long struggled with the limitations of legacy mainframe systems, particularly in ensuring data certainty and consistency across diverse and dynamic environments. The need for a solution that can seamlessly integrate with existing systems, provide real-time processing capabilities, and ensure data integrity and security has been a pressing issue for many years. The invention disclosed herein addresses these needs by providing a robust, flexible, and resilient data processing solution that bridges the gap between legacy systems and modern data requirements such as online applications, ensuring data certainty and consistency in a way that was previously unattainable, without requiring legacy or current applications to be rewritten for compatibility.

SUMMARY OF THE INVENTION

The present invention includes an innovative application designed to address the inherent challenges associated with legacy mainframe data processing and new online transaction processing. This invention is pivotal in environments where data is delivered in non-portable, platform-dependent, and rigid legacy formats, making it difficult to integrate with modern, dynamic data processing systems.

The objective is to establish "Two-Party" Controls and an "intercept" capability between a Financial Authorization System (FAST) mainframe and various channels to ensure File Level Units of Work (UOW) and maintain "Data Certainty." This involves developing a new FAST Gatekeeper (FGK) midrange application that can deliver the necessary controls and monitoring during data exchanges between the FAST mainframe and other channels. The FGK is designed to facilitate comprehensive monitoring, ensure resiliency, enable recoverability, and support research capabilities both currently and in the future.

The FGK (a/k/a Smart Gatekeeper) aims to identify, mitigate, and report any inconsistencies or irregularities in the data. It proactively addresses potential issues to protect FAST data, such as preventing data duplicates. The system will mimic the checks and balances of the FAST mainframe construct, ensuring that the controls and data integrity measures of the mainframe are extended to data exchanges with other channels. This includes verifying data consistency, detecting and correcting errors, and ensuring that all transactions are accurately processed and logged. The ultimate goal is to enhance data integrity, security, and operational efficiency while providing robust tools for monitoring and managing data exchanges.

The primary function of the Smart Gatekeeper is to provide a resilient, transparent, and adaptable solution for data exchange between different platforms while maintaining data certainty and consistency. It achieves this by ensuring control, monitoring, resiliency, recoverability, and research capability during data exchanges. This invention's importance cannot be overstated in a data-centric world where organizations rely on accurate and timely data to make critical business decisions.

The Smart Gatekeeper operates independently of the platform, which is a significant departure from traditional mainframe systems that are typically constrained by their inherent platform dependencies. This independence is crucial in modern data environments where data needs to be dynamically managed and routed based on current system health and availability. The Smart Gatekeeper ensures that data is processed efficiently and accurately, regardless of its origin or destination, which significantly enhances the flexibility and efficiency of data processing operations. By removing the constraints of platform dependency, organizations can achieve seamless data integration across various systems, improving overall data management and operational efficiency.

One of the core features of the Smart Gatekeeper is its ability to convert data from legacy formats to modern, compatible formats without compromising data integrity. This conversion is essential in ensuring that data processed by the Smart Gatekeeper is accurate and reliable, which is critical in environments where data accuracy and timeliness are paramount. The Smart Gatekeeper performs this conversion in real-time, which eliminates the delays associated with traditional batch processing methods and ensures that data is processed and available for use as soon as it is received. This real-time conversion capability is a game-changer for organizations that need to make timely decisions based on the most current data available.

The Smart Gatekeeper also incorporates robust data validation and security measures to ensure the integrity and security of the data it processes. It externalizes data governance rules, which allows for dynamic and flexible data validation and security checks. These checks ensure that the data being processed meets all necessary validation requirements and is free from errors and inconsistencies. The Smart Gatekeeper's validation process includes checks for duplicate data, stale data, and data format compliance, which significantly reduces the risk of data errors and inconsistencies. By implementing these rigorous validation procedures, the Smart Gatekeeper ensures that only high-quality data is processed and used in decision-making processes.

Another significant feature of the Smart Gatekeeper is its resiliency. It is designed to operate across multiple data centers with built-in measures to ensure continuous operation even in the event of a system failure. This resiliency is achieved through a combination of server health checks and URL-based routing, which ensures that data is always routed to the nearest and healthiest server for processing. This design ensures that there is no data loss and that data processing can continue uninterrupted, which is crucial in environments where downtime can have significant financial and operational impacts. The ability to maintain continuous operation across multiple data centers enhances the reliability and robustness of the Smart Gatekeeper, making it an indispensable tool for mission-critical applications.

The Smart Gatekeeper also includes a robust audit and logging capability that provides comprehensive visibility into the data processing operations. This capability ensures that all data processing activities are logged and can be audited, which is essential for maintaining data security and compliance with regulatory requirements. The audit logs provide detailed information about all data processing activities, including the origin and destination of data, the validation checks performed, and any errors or issues encountered during processing. This level of transparency is vital for organizations to ensure that their data processing practices are in line with regulatory standards and to quickly identify and address any potential issues.

In addition to its core data processing capabilities, the Smart Gatekeeper also includes advanced features for managing and reconciling data. It can reconcile data processed from multiple sources to ensure that all data is accurate and consistent. This reconciliation process includes checks for data integrity and consistency, which ensures that all data processed by the Smart Gatekeeper is reliable and accurate. The Smart Gatekeeper also includes features for managing data exceptions and errors, which allows it to identify and address any issues that may arise during data processing. By effectively managing data exceptions and ensuring consistency, the Smart Gatekeeper helps organizations maintain high data quality standards.

The Smart Gatekeeper is designed to be highly adaptable and can be configured to meet the specific needs of different environments. It includes a flexible rule engine that allows for the dynamic configuration of data validation and processing rules. This flexibility ensures that the Smart Gatekeeper can be easily adapted to meet the changing needs of the environment in which it operates, which is essential in today's fast-paced and constantly evolving data environments. The ability to quickly adapt to new data requirements and processing rules makes the Smart Gatekeeper a versatile tool for a wide range of applications.

One of the unique aspects of the Smart Gatekeeper is its ability to provide real-time data processing and analytics. Traditional mainframe systems are typically designed for batch processing, which means that data is processed in large chunks at scheduled intervals. The Smart Gatekeeper, on the other hand, processes data in real-time, which ensures that data is available for use as soon as it is received. This real-time processing capability is crucial in environments where timely access to data is essential for decision-making and operational efficiency. By enabling real-time data processing, the Smart Gatekeeper allows organizations to respond more quickly to changing conditions and make more informed decisions.

The Smart Gatekeeper also includes features for preventing data duplication and ensuring data consistency. It performs checks to ensure that data is not duplicated across different systems and applications, which significantly reduces the risk of data inconsistencies and errors. These checks are performed as part of the data validation process and ensure that all data processed by the Smart Gatekeeper is unique and accurate. This capability is particularly important in environments where data accuracy and consistency are critical. By preventing data duplication, the Smart Gatekeeper helps organizations maintain a single source of truth for their data.

Overall, the Smart Gatekeeper for Data Certainty is a comprehensive solution designed to address the significant challenges associated with legacy mainframe data processing. It provides a robust, flexible, and resilient solution for ensuring data certainty and consistency in modern data environments. By converting legacy data formats to modern, compatible formats, performing robust data validation and security checks, ensuring continuous operation across multiple data centers, providing comprehensive audit and logging capabilities, managing and reconciling data, and preventing data duplication, the Smart Gatekeeper significantly enhances the efficiency, reliability, and security of data processing operations. This invention meets a long-felt and unmet need for a modern, adaptable, and resilient solution for data processing in environments where data accuracy and timeliness are critical. The Smart Gatekeeper represents a significant advancement in data processing technology, offering a solution that bridges the gap between legacy systems and modern data requirements, ensuring that organizations can maintain data integrity and make informed decisions based on accurate and timely data.

The core processing modules of the Smart Gatekeeper are designed to ensure efficient and accurate data handling throughout the entire data processing workflow. The File Manager is the initial module responsible for detecting the arrival of new files. Upon detecting a new file, it undertakes the crucial task of sanitizing the data to ensure that it is free from any potentially harmful or corrupt elements. Following sanitization, the File Manager converts the data into the required format, making it compatible with the subsequent processing stages. It also updates the Gatekeeper Control Database (GKC DB) with relevant information about the file, such as its status and metadata, ensuring that all processed data is accurately tracked and documented.

The Validation module plays a pivotal role in maintaining data integrity and certainty. It performs thorough checks on the data, validating both the headers and trailers to ensure that the data structure conforms to the expected standards. This module categorizes any exceptions that may arise during validation, such as discrepancies or inconsistencies, which allows for targeted troubleshooting and resolution. By ensuring that only validated and reliable data progresses to the next stages, the Validation module acts as a gatekeeper, preventing the propagation of errors through the system.

The Transaction Manager Resource Adapter (TMRA) is integral to the transaction processing capability of the Smart Gatekeeper. It splits the incoming data into individual transactions, ensuring that each transaction is processed independently and efficiently. The TMRA identifies the affinity of each transaction, which determines the most appropriate processing path based on factors such as geographic location or system load. This module then processes each transaction, ensuring that it is executed correctly and in accordance with the defined rules and protocols.

The Reconciliation module ensures consistency and accuracy in the data processing workflow. After transactions have been processed, the Reconciliation module performs a thorough reconciliation of the data, comparing the processed results with the original data to ensure that all transactions have been accurately and completely processed. Any discrepancies identified during this reconciliation process are addressed, ensuring that the final data set is consistent and reliable. The module also updates the GKC DB with the reconciled data, maintaining an accurate record of all processed transactions.

In addition to these core processing modules, the Smart Gatekeeper includes auxiliary modules that enhance its functionality and provide additional layers of control and monitoring. The Backout module is a critical feature that allows for the manual reversal of transactions if needed. This capability is particularly important in scenarios where errors are detected post-processing, as it provides a mechanism for undoing transactions and restoring the data to its previous state. This ensures that the system can recover from errors without compromising data integrity.

The Web UI is another auxiliary module that provides a user-friendly interface for monitoring and managing the Smart Gatekeeper's operations. Through the Web UI, administrators and users can oversee file processing activities, track the status of transactions, and manage user access and permissions. This interface enhances the operational transparency of the Smart Gatekeeper and facilitates efficient management of the data processing workflow.

The infrastructure of the Smart Gatekeeper is designed to ensure high availability, resiliency, and continuous operation across multiple data centers. It leverages a combination of server health checks and URL-based routing to manage file transfers and maintain data quality. This infrastructure ensures that data is always processed by the most reliable and available servers, minimizing the risk of data loss and downtime. The Smart Gatekeeper's ability to operate across multiple data centers provides an added layer of resiliency, ensuring that data processing can continue uninterrupted even in the event of a server or data center failure.

The Smart Gatekeeper's functionality is further enhanced by its core Extract Transform Execute Balance (ETEB) process. This comprehensive process encompasses all stages of data handling, from initial extraction to final reconciliation. The extraction phase involves retrieving data from various sources and converting it into a format suitable for processing. The transformation phase involves converting the extracted data into a compatible format, ensuring that it meets the requirements of the processing system. During the execution phase, the transformed data is processed, with each transaction being executed according to predefined rules and protocols. The balance phase involves reconciling the processed data to ensure that all transactions have been accurately executed and that the final data set is consistent and reliable.

Real-time processing is a key feature of the Smart Gatekeeper, enabling it to convert batch records into online transactions with high-level scrutiny and reconciliation. This real-time capability ensures that data is processed and available for use as soon as it is received, which is crucial in environments where timely access to data is essential for decision-making and operational efficiency. By enabling real-time data processing, the Smart Gatekeeper allows organizations to respond more quickly to changing conditions and make more informed decisions.

The Smart Gatekeeper also implements robust validation and security measures to ensure the integrity and security of the data it processes. It externalizes data governance rules, allowing for dynamic and flexible validation and security checks during data transit. These checks ensure that the data being processed meets all necessary validation requirements and is free from errors and inconsistencies. By implementing these rigorous validation procedures, the Smart Gatekeeper ensures that only high-quality data is processed and used in decision-making processes, thereby maintaining the highest standards of data integrity and security.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, the inventive process begins with the DDS (Data Distribution Service) receiving files from various channels. These channels could include different data sources and systems that feed into the Gatekeeper. Once the files are received, they are routed to the nearest and healthiest Gatekeeper landing zone (GK LZ) using NDM (Network Data Mover). The use of NDM ensures that the data is directed to the optimal location for processing, considering factors like server health and availability, which helps in maintaining high processing efficiency and reliability.

Upon the file's arrival at the designated landing zone, the File Manager component of the Smart Gatekeeper detects the new file. The first task the File Manager undertakes is to sanitize the file. Sanitization involves checking the file for any corrupt or harmful elements that could compromise the integrity of the data processing workflow. If the sanitization check passes, the File Manager converts the file from EBCDIC (Extended Binary Coded Decimal Interchange Code) to ASCII (American Standard Code for Information Interchange), a format suitable for further processing. Both the original EBCDIC file and the converted CSV formatted file are then moved to the "In Process" folder. The status and date of the file are updated in the Gatekeeper Control Database (GKC DB), ensuring accurate tracking of the file's progress. This step also includes writing relevant logs to Splunk and closing the session to maintain a clear audit trail.

If the initial sanitization check fails, the File Manager proceeds by creating and inserting a landed file record in the GKC DB. This record serves as a reference point for all subsequent processing steps. The file undergoes further sanitization to ensure it is free from any issues that could affect data integrity. After successful sanitization, the system checks for duplicate files. Duplicate files can cause significant issues, such as data inconsistencies and redundant processing, so this check is crucial. If a duplicate is detected, the system takes appropriate measures to handle it, such as flagging it for review or rejecting it from further processing. If no duplicates are found, the file moves on to the validation phase.

The Validation module plays a crucial role in ensuring data certainty. During this phase, the system validates the headers and trailers (H/T) fields of the file using the converted CSV format. This validation ensures that the file structure is correct and that the data within the file meets predefined standards. If the validation is successful, the file is inserted into the Gatekeeper (GKC) and approved to proceed. If there are issues with the headers or trailers, the system identifies and categorizes the exceptions, and appropriate logs are created in the GKC DB. These logs help in diagnosing and addressing any validation errors, ensuring that only validated and reliable data progresses further.

Following validation, the file enters the Transaction Manager Resource Adapter (TMRA) process. The TMRA is responsible for splitting the data into individual transactions, distinguishing between debits (DR) and credits (CR). It then identifies the affinity of each transaction, which determines the system, and potential geographical location thereof, for processing. This affinity-based routing ensures that transactions are processed by the appropriate systems, optimizing processing efficiency. The TMRA then converts the data back from ASCII to EBCDIC and invokes the relevant transaction codes, which correspond to specific financial processes that must be executed accurately.

After the transactions are processed, the system enters the reconciliation phase. The Reconciliation module loops through detailed transactions to accumulate debit and credit counts, totals, and floats for reconciliation. This phase ensures that all transactions have been accurately executed and that the final data set is consistent and reliable. Affinity-based processing ensures that location for one particular region is processed on a FAST (financial system transaction) system for that particular region. If the service affinity value changes, the system adjusts accordingly to ensure that data is processed by the correct systems.

Upon successful reconciliation, the data's status and date are updated in the GKC, and detailed logs are recorded in the GKC DB. These logs provide a comprehensive record of all processing activities, facilitating audits and ensuring transparency. If any errors occur during processing, the backout process can be manually invoked. The backout module allows for the reversal of transactions, restoring the data to its previous state and ensuring data integrity.

Throughout the entire process, the Smart Gatekeeper maintains rigorous data validation and security measures. It implements externalized data governance rules, allowing for dynamic and flexible validation checks. These checks ensure that the data being processed meets all necessary validation requirements and is free from errors and inconsistencies. By ensuring that only high-quality data is processed, the Smart Gatekeeper helps maintain the highest standards of data integrity and security.

The Smart Gatekeeper's infrastructure is designed for resiliency, operating across multiple data centers to ensure continuous operation even in the event of a system failure. Server health checks and URL-based routing are utilized to manage file transfers, ensuring that data is always processed by the most reliable servers. This infrastructure minimizes the risk of data loss and downtime, which is crucial for maintaining operational efficiency.

In some arrangements, a system for managing, validating, securing, and ensuring the integrity of data exchanges between a mainframe system and external channels includes a Data Distribution Service (DDS) configured to receive files from various channels. The system also includes a Network Data Mover (NDM) configured to route the files to a Gatekeeper Landing Zone (GK LZ).

In some arrangements, the system includes a File Manager module configured to detect the arrival of new files at the GK LZ, perform initial sanitization to check for any corrupt or harmful elements, create a landed file record in the Gatekeeper Control Database (GKC DB), perform supplemental file sanitization to ensure the files are free from harmful elements, convert the files from Extended Binary Coded Decimal Interchange Code (EBCDIC) to American Standard Code for Information Interchange (ASCII) format, move both the original EBCDIC files and the converted ASCII formatted files into an "In Process" folder, and update the status and date of the files in the GKC DB.

In some arrangements, the system includes a Validation module configured to validate the header and trailer fields in the converted CSV files to ensure data structure compliance, check for duplicate files and handle duplicates appropriately, and insert validated files into the Gatekeeper and approve them to proceed.

In some arrangements, the system includes a Transaction Manager Resource Adapter (TMRA) module configured to split the data into individual transactions, identify affinity routing for each transaction to determine the appropriate system for processing based on geographic location or system load, convert the data back from ASCII to EBCDIC, and invoke relevant transaction codes to initiate financial transactions within the FAST system.

In some arrangements, the system includes a Reconciliation module configured to reconcile the processed data to ensure consistency and accuracy by comparing the processed results with the original data, update the status and date of the reconciled data in the GKC DB, and record detailed logs.

In some arrangements, the system includes a Backout module configured to initiate a backout process to reverse transactions if discrepancies are found during reconciliation.

In some arrangements, the system includes a security and validation mechanism configured to maintain rigorous data validation and security measures throughout the process to ensure data integrity and compliance with necessary standards.

In some arrangements, the system includes an infrastructure configured to ensure continuous operation across multiple data centers using server health checks and URL-based routing to manage file transfers.

In some arrangements, the system includes an audit and logging mechanism configured to provide a comprehensive audit and logging capability to facilitate audits and ensure transparency of all data processing activities.

In some arrangements, the system includes a Network Data Mover (NDM) that further comprises a server health check module configured to continuously monitor the health of servers and dynamically route files to the most reliable and available servers based on real-time conditions.

In some arrangements, the File Manager module further comprises a sanitization engine that performs both initial and supplemental sanitization by scanning for and removing potential malware, corrupt data segments, and other harmful elements from the files.

In some arrangements, the Validation module further includes a rules engine that dynamically applies data governance rules to ensure the headers and trailers of the files conform to predefined standards and formats.

In some arrangements, the Validation module is configured to log any validation exceptions and errors in the Gatekeeper Control Database (GKC DB) and categorize these exceptions for further analysis and troubleshooting.

In some arrangements, the Transaction Manager Resource Adapter (TMRA) module further includes a transaction affinity analyzer that determines the optimal processing path for each transaction based on geographic location, current system load, and processing requirements.

In some arrangements, the TMRA module is also configured to perform batch processing of transactions when the system detects a high volume of transactions, ensuring efficiency and timeliness in transaction processing.

In some arrangements, the Reconciliation module further comprises a detailed transaction comparison tool that verifies the consistency and accuracy of processed data against original data by using checksum and other integrity verification techniques.

In some arrangements, the Backout module includes a rollback mechanism that automatically initiates a backout process for transactions that fail reconciliation, ensuring data integrity is maintained.

In some arrangements, the security and validation mechanism includes an externalized data governance framework that allows for the real-time updating and application of security policies and validation rules to adapt to emerging threats and compliance requirements.

In some arrangements, the system further comprises a comprehensive monitoring and alert system integrated with the audit and logging capability, providing real-time alerts and detailed audit trails for all data processing activities to facilitate rapid response to any anomalies or security breaches.

In some arrangements, a method for managing, validating, securing, and ensuring the integrity of data exchanges between a mainframe system and external channels comprises the steps of receiving files from various channels via a Data Distribution Service (DDS). The method includes routing the files to a Gatekeeper Landing Zone (GK LZ) using a Network Data Mover (NDM), wherein the NDM dynamically routes files based on real-time server health and availability. Additionally, the method involves detecting the arrival of new files at the GK LZ using a File Manager module and performing initial sanitization to remove any corrupt or harmful elements from the files.

In some arrangements, the method further comprises creating a landed file record in the Gatekeeper Control Database (GKC DB) to track the file's progress and status. The method includes performing supplemental sanitization on the files to ensure they are free from any residual harmful elements. Moreover, the method involves converting the files from Extended Binary Coded Decimal Interchange Code (EBCDIC) to American Standard Code for Information Interchange (ASCII) format to make the data compatible with modern processing systems.

In some arrangements, the method includes moving both the original EBCDIC files and the converted ASCII formatted files into an "In Process" folder, while updating the status and date of the files in the GKC DB. The method involves validating the header and trailer fields in the converted CSV files using a Validation module to ensure data structure compliance with predefined standards. Additionally, the method comprises checking for duplicate files and categorizing any exceptions using a rules engine within the Validation module, and logging these exceptions in the GKC DB for further analysis and troubleshooting.

In some arrangements, the method involves inserting validated files into the Gatekeeper and approving them to proceed to the next stage of processing. The method includes initiating a Transaction Manager Resource Adapter (TMRA) process to split the data into individual transactions, distinguishing between debits and credits. Furthermore, the method involves identifying affinity routing for each transaction to determine the appropriate system for processing based on geographic location, current system load, and processing requirements, ensuring optimal transaction processing efficiency.

In some arrangements, the method comprises converting the data back from ASCII to EBCDIC and invoking relevant transaction codes to initiate financial transactions within the FAST system, ensuring accurate and timely transaction execution. The method includes reconciling the processed data using a Reconciliation module to ensure consistency and accuracy by comparing the processed results with the original data, utilizing detailed transaction comparison tools such as checksums for integrity verification. Additionally, the method involves updating the status and date of the reconciled data in the GKC DB and recording detailed logs of all processing activities to facilitate audits and ensure transparency.

In some arrangements, the method includes initiating a backout process using a rollback mechanism in the Backout module to reverse transactions if discrepancies are found during reconciliation, maintaining data integrity. The method involves maintaining rigorous data validation and security measures throughout the entire process by implementing an externalized data governance framework that allows for the real-time updating and application of security policies and validation rules to adapt to emerging threats and compliance requirements. Furthermore, the method includes ensuring continuous operation across multiple data centers using server health checks and URL-based routing to manage file transfers, thereby minimizing the risk of data loss and downtime. Finally, the method comprises providing a comprehensive audit and logging capability integrated with a monitoring and alert system to provide real-time alerts and detailed audit trails of all data processing activities, facilitating rapid response to any anomalies or security breaches.

In some arrangements, the method further comprises the step of continuously monitoring the health of servers and dynamically updating the routing of files based on the current server health and availability using a server health check module within the Network Data Mover (NDM).

In some arrangements, the initial sanitization performed by the File Manager module includes scanning the files for malware, corrupt data segments, and other harmful elements, and removing any detected threats to ensure data integrity.

In some arrangements, the method further comprises the step of validating the files using a dynamic rules engine within the Validation module, wherein the rules engine applies real-time data governance rules to ensure the headers and trailers of the files conform to predefined standards and formats.

In some arrangements, the Transaction Manager Resource Adapter (TMRA) process includes a transaction affinity analyzer that determines the optimal processing path for each transaction based on geographic location, current system load, and processing requirements to enhance processing efficiency.

In some arrangements, the method further comprises the step of performing batch processing of transactions when the system detects a high volume of transactions, ensuring efficiency and timeliness in transaction processing.

In some arrangements, the comprehensive audit and logging capability includes a detailed transaction comparison tool that verifies the consistency and accuracy of processed data against original data by using checksums and other integrity verification techniques, and logs these activities in the Gatekeeper Control Database (GKC DB).

In some arrangements, a method for ensuring the integrity and security of data exchanges between different systems comprises the steps of receiving data from one or more source systems. The method includes sanitizing the received data to remove any corrupt or harmful elements, validating the data to ensure it meets predefined standards and formats, and logging the data validation results.

In some arrangements, the method involves processing the validated data to perform one or more transactions. The method includes reconciling the processed data to ensure consistency and accuracy, and recording detailed logs of the reconciliation process. Additionally, the method comprises updating a database with the status and results of the data processing and implementing security measures throughout the data exchange process to maintain data integrity and compliance with standards.

In some arrangements, the method further comprises the step of dynamically routing the data based on real-time server health and availability to ensure optimal processing efficiency.

In some arrangements, the external channels are online applications performing transaction processing and the mainframe system performs batch processing.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention.

Unless contextually evident, the singular forms of "a," "an," and "the" used throughout the specification and claims should be interpreted to include their plural counterparts.

DETAILED DESCRIPTION

Figure 1:
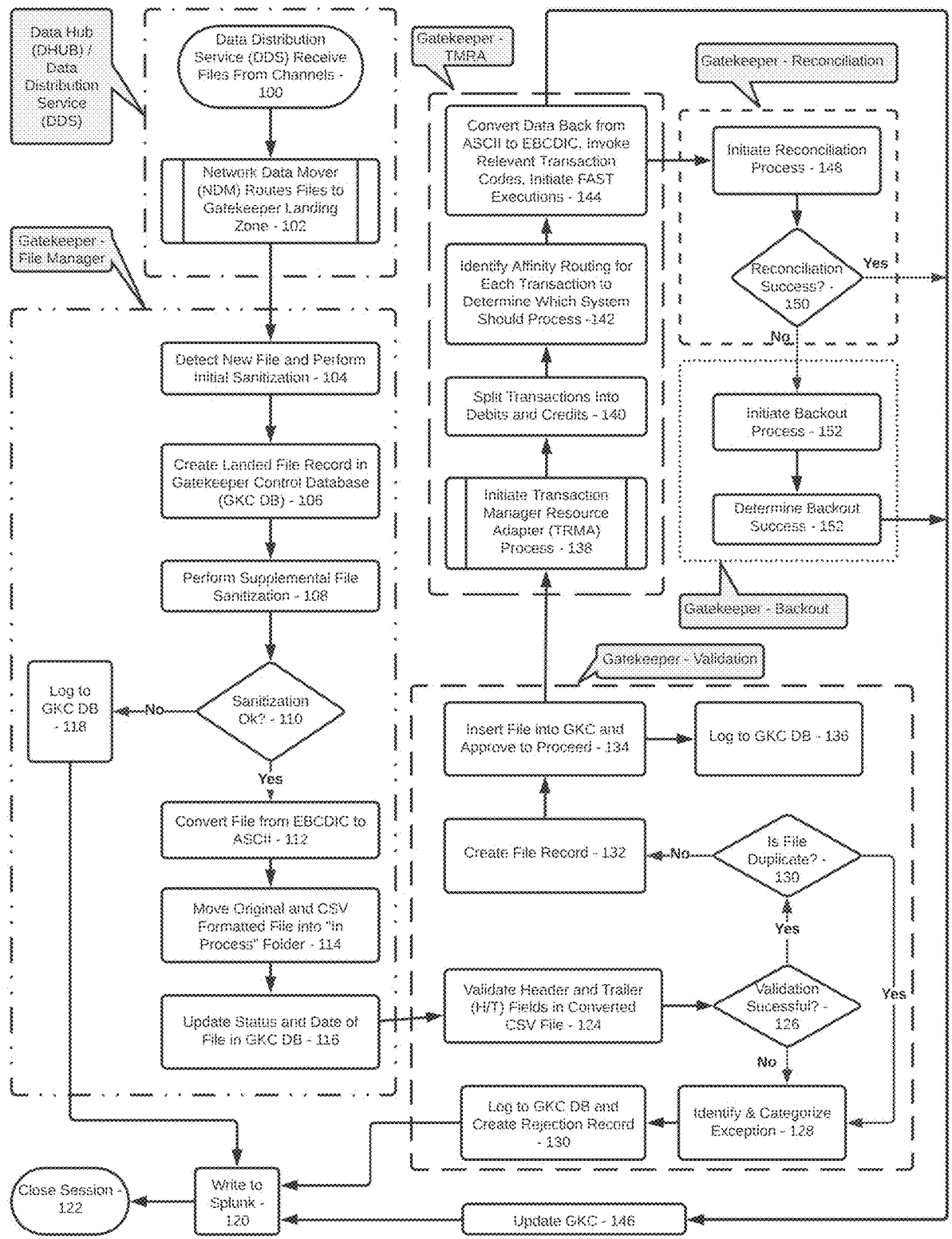
FIG. 1 is a flow diagram that illustrates a sample process for receiving, sanitizing, validating, and processing data files, ensuring data integrity and consistency. It details the steps from initial file detection through sanitization, format conversion, validation, transaction processing, and reconciliation, concluding with comprehensive logging and data update processes.

At a high level, the invention addresses significant challenges in managing data exchanges between legacy mainframe systems (e.g., performing daily batch processing) and newer online applications (e.g., providing real-time individual transaction processing) without requiring legacy applications or new online applications to be rewritten. This innovative application ensures control, monitoring, resiliency, recoverability, and research capabilities during data transfers. The primary function of the Smart Gatekeeper is to provide a resilient, transparent, and adaptable solution for data exchange, maintaining data certainty and consistency. It operates independently of the platform, allowing for seamless data integration across various systems, thus enhancing overall data management and operational efficiency. One of its core features is the ability to convert data from legacy formats to modern compatible formats without compromising data integrity. This conversion is performed in real-time, eliminating delays associated with traditional batch processing methods.

The Smart Gatekeeper incorporates robust data validation and security measures, externalizing data governance rules to allow dynamic and flexible validation checks. These checks ensure the data meets all necessary validation requirements and is free from errors and inconsistencies. The validation process includes checks for duplicate data, stale data, and data format compliance, significantly reducing the risk of data errors. The system's resiliency is another key feature, operating across multiple data centers to ensure continuous operation even in the event of a system failure. Server health checks and URL-based routing manage file transfers, ensuring data is always processed by the most reliable servers.

The Smart Gatekeeper includes a comprehensive audit and logging capability, providing detailed information about all data processing activities. This transparency is crucial for maintaining data security and compliance with regulatory requirements. Advanced features for managing and reconciling data ensure that all processed data is accurate and consistent. The Smart Gatekeeper's flexible rule engine allows for dynamic configuration of data validation and processing rules, making it adaptable to meet the changing needs of different environments. Real-time processing and analytics capabilities enable timely access to data, crucial for decision-making and operational efficiency.

The core processing modules include the File Manager, responsible for detecting and sanitizing new files, converting them to the required format, and updating the Gatekeeper Control Database (GKC DB). The Validation module performs thorough checks on the data, ensuring its integrity and structure. The Transaction Manager Resource Adapter (TMRA) processes individual transactions, ensuring they are executed correctly. The Reconciliation module ensures consistency and accuracy in the data processing workflow by comparing processed results with the original data. Auxiliary modules, such as the Backout module and the Web UI, enhance functionality by providing error correction, data restoration, and user-friendly interface capabilities.

The invention modernizes mainframe batch processing providing seamless integration with real-time transaction processing, ensuring data integrity and consistency through dynamic routing. It provides geographic-independent data consistency, operates resiliently without downtime, and validates data before making changes to the master data. The invention is platform-independent, compatible with multiple file formats, and prevents data duplication while adhering to defined Service Level Agreements (SLA).

Overall, the Smart Gatekeeper for Data Certainty represents a significant advancement in data processing technology, bridging the gap between legacy systems and modern data requirements. By providing a robust, flexible, and resilient solution, it ensures data integrity, accuracy, and timely access to data, making it an indispensable tool for environments where data accuracy and timeliness are critical.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers. They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models—Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering:

Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

FIG. 1, by way of non-limiting disclosure, depicts a detailed flow diagram of the Smart Gatekeeper for Data Certainty, illustrating the step-by-step process of data handling and validation. The process begins with the Data Distribution Service (DDS) receiving files from various channels (Step 100). These channels could include different data sources and systems that feed into the Gatekeeper. Once the files are received, they are routed by the Network Data Mover (NDM) to the Gatekeeper Landing Zone (Step 102). The use of NDM ensures that the data is directed to the optimal location for processing, considering factors like server health and availability, which helps in maintaining high processing efficiency and reliability.

Upon arrival at the landing zone, the system detects the new file and performs an initial sanitization to check for any corrupt or harmful elements (Step 104). This initial sanitization step ensures that the data does not contain any potentially harmful content that could compromise the integrity of the data processing workflow. If the file passes this initial check, a landed file record is created in the Gatekeeper Control Database (GKC DB), ensuring accurate tracking of the file's progress (Step 106). This record includes metadata about the file, such as its status and other relevant information, which helps in monitoring and managing the data throughout the processing pipeline.

Subsequently, the file undergoes supplemental sanitization for a more thorough check (Step 108). This additional sanitization step ensures that any residual issues or harmful elements that were not caught during the initial check are addressed. If the file passes this stage, it is converted from Extended Binary Coded Decimal Interchange Code (EBCDIC) to American Standard Code for Information Interchange (ASCII) format (Step 112). This conversion is essential to make the data compatible with modern processing systems, as EBCDIC is a legacy format commonly used in mainframe environments. Both the original EBCDIC file and the newly formatted CSV file are then moved to the "In Process" folder (Step 114). This step ensures that the original data is preserved while the converted data is prepared for further processing. The system updates the status and date of the file in the GKC DB (Step 116), ensuring all actions are logged for audit purposes and providing a clear record of the file's journey through the processing pipeline.

If the file fails the supplemental sanitization, it is logged into the GKC DB (Step 118) and written to Splunk for detailed logging (Step 120) before closing the session (Step 122). Logging to Splunk provides detailed information about the failure, which can be used for troubleshooting and analysis to understand why the file did not pass sanitization. This detailed logging ensures that any issues can be promptly addressed, maintaining the integrity and reliability of the data processing system.

The next phase involves the validation of the file. The Gatekeeper File Manager validates the header and trailer fields in the converted CSV file to ensure data structure compliance (Step 124). This validation step checks that the data structure conforms to the expected standards and that all necessary fields are present and correctly formatted. If the validation is successful (Step 126), the system checks for duplicate files (Step 130). Duplicate files can cause significant issues, such as data inconsistencies and redundant processing, so this check is crucial to maintain data integrity. If a duplicate is detected, appropriate logs are created, and a rejection record is inserted into the GKC DB (Step 130). This logging helps in diagnosing and addressing any validation errors, ensuring that only validated and reliable data progresses further. If no duplicates are found, a new file record is created (Step 132), and the file is inserted into the Gatekeeper and approved to proceed further (Step 134).

The file then enters the Transaction Manager Resource Adapter (TMRA) process (Step 138), where the data is split into individual transactions, distinguishing between debits and credits (Step 140). The TMRA identifies the affinity routing for each transaction, determining the appropriate system for processing based on factors like geographic location or system load (Step 142). This affinity-based routing ensures that transactions are processed by the most suitable systems, optimizing processing efficiency and accuracy. The data is then converted back from ASCII to EBCDIC (Step 144), and relevant transaction codes are invoked to initiate financial transactions within the FAST system. This step ensures that the transactions are executed accurately and in accordance with the defined rules and protocols.

Following transaction processing, the system enters the reconciliation phase (Step 148). The Reconciliation module loops through detailed transactions to accumulate debit and credit counts, totals, and floats for reconciliation. This phase ensures that all transactions have been accurately executed and that the final data set is consistent and reliable. If reconciliation is successful (Step 150), the data's status and date are updated in the GKC DB (Step 146), and detailed logs are recorded in the GKC DB. These logs provide a comprehensive record of all processing activities, facilitating audits and ensuring transparency. If any discrepancies are found, a backout process is initiated to reverse the transactions, restoring the data to its previous state (Step 152). The backout process includes determining the success of the reversal and updating the GKC DB accordingly.

Throughout the entire process, rigorous data validation and security measures are maintained to ensure data integrity and compliance with necessary standards. This comprehensive workflow ensures that data is processed accurately, efficiently, and securely, addressing the challenges of data certainty and consistency in modern data environments. The Smart Gatekeeper's infrastructure is designed for resiliency, operating across multiple data centers to ensure continuous operation even in the event of a system failure. Server health checks and URL-based routing manage file transfers, ensuring that data is always processed by the most reliable servers. This infrastructure minimizes the risk of data loss and downtime, which is crucial for maintaining operational efficiency. The Smart Gatekeeper represents a significant advancement in data processing technology, offering a robust, flexible, and resilient solution for ensuring data certainty and consistency in complex data environments.

The primary goal of the FGK (Gatekeeper) is to perform the actions of Approve/Decline, Process, and Report/Balance data. In this context, Approve/Decline refers to the process of determining whether the data meets specific validation or certainty standards. This includes identifying issues such as bad files, date errors, or other anomalies that could compromise data integrity. The system will either approve the data for further processing if it passes these checks or decline it if it fails.

When the Data Hub (DHUB) receives a BMP (Batch Message Processing) file that it plans to transfer to the FGK landing zone using the Network Data Mover (NDM), it should follow a specific path naming convention.

The "File Manager" processing module on the FGK, also known as the "Start of Session," continuously monitors for any new files or triggers received in the Gatekeeper Landing Zone. When the FGK detects a new file, it initiates file-level metadata validation. This validation step ensures that the file's metadata is accurate and conforms to expected standards. After validation, the File Manager updates the "L" (Landed File) record in the Gatekeeper Control Database (GKC DB) with the current status of the file. If the file is valid, it then converts the data from its original format (EBCDIC) to a more accessible format (ASCII), creating a converted CSV ASCII file. This converted file will be used as input for the subsequent processing modules, specifically Validation and TMRA.

The "Validation" processing module on the FGK focuses on ensuring data certainty. It looks for landed files that have the correct status, indicating that the File Manager step has been completed successfully and validation has not yet started. The Validation module processes the CSV file output from the File Manager, performing specific data validations or checks for data certainty failures. This includes verifying the integrity of the data, checking for duplicate records, and ensuring that the data is in the correct format and follows all predefined rules. If any issues are found during this validation process, the module categorizes the exceptions and records the results in the Gatekeeper DB Landed File record.

Based on the validation results, the system decides whether to approve or decline the file. If the file is approved, the status on the Landed File DB record is updated to indicate that it is ready for the TMRA process. If the file is declined, the system provides a detailed status indicating the reason for the failure, such as the file being a duplicate or having an invalid source/date. This status is crucial for maintaining data integrity and ensuring that only high-quality data proceeds through the processing pipeline.

The next phase involves the Transaction Manager Resource Adapter (TMRA) process, where the approved data is split into individual transactions, distinguishing between debits and credits. The TMRA identifies the affinity routing for each transaction, determining the appropriate system for processing based on factors like geographic location or system load. This affinity-based routing ensures that transactions are processed by the most suitable systems, optimizing processing efficiency and accuracy. The data is then converted back from ASCII to EBCDIC, and relevant transaction codes are invoked to initiate financial transactions within the FAST system. This step ensures that the transactions are executed accurately and in accordance with the defined rules and protocols.

Following transaction processing, the system enters the reconciliation phase. The Reconciliation module loops through detailed transactions to accumulate debit and credit counts, totals, and floats for reconciliation. This phase ensures that all transactions have been accurately executed and that the final data set is consistent and reliable. If reconciliation is successful, the data's status and date are updated in the GKC DB, and detailed logs are recorded in the GKC DB. These logs provide a comprehensive record of all processing activities, facilitating audits and ensuring transparency. If any discrepancies are found, a backout process is initiated to reverse the transactions, restoring the data to its previous state. The backout process includes determining the success of the reversal and updating the GKC DB accordingly.

Throughout the entire process, rigorous data validation and security measures are maintained to ensure data integrity and compliance with necessary standards. This comprehensive workflow ensures that data is processed accurately, efficiently, and securely, addressing the challenges of data certainty and consistency in modern data environments. The Smart Gatekeeper's infrastructure is designed for resiliency, operating across multiple data centers to ensure continuous operation even in the event of a system failure. Server health checks and URL-based routing manage file transfers, ensuring that data is always processed by the most reliable servers. This infrastructure minimizes the risk of data loss and downtime, which is crucial for maintaining operational efficiency. The Smart Gatekeeper represents a significant advancement in data processing technology, offering a robust, flexible, and resilient solution for ensuring data certainty and consistency in complex data environments.

Figure 2:
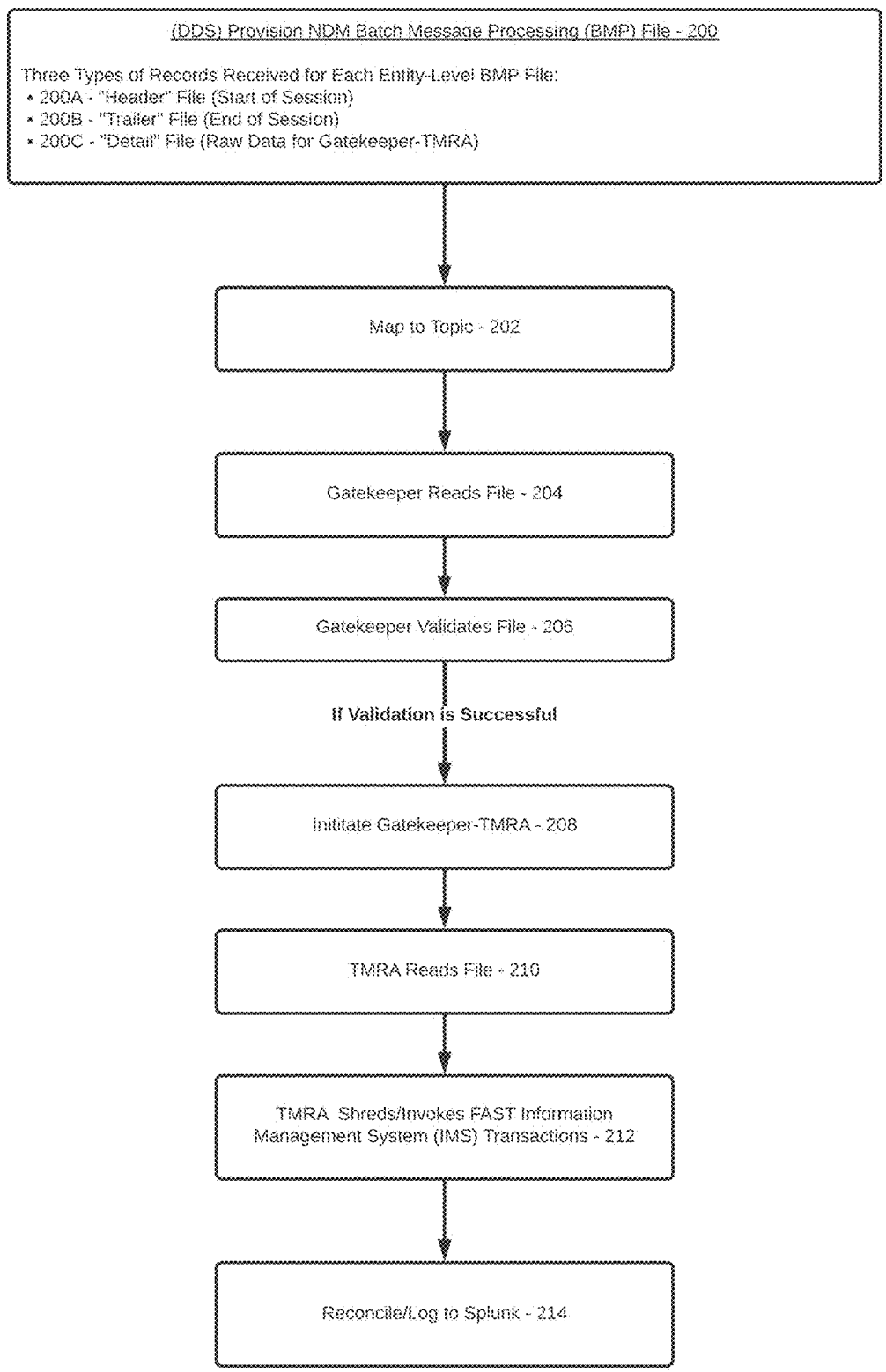
FIG. 2 illustrates sample data flow, showing the process from receiving an Network Data Mover (NDM) Batch Message Processing (BMP) file through reading, validating, and processing the file's data, including shredding and invoking transactions via the FAST IMS, and ending with reconciliation and logging to Splunk. The diagram highlights key steps such as file validation, initiation of transaction management, and comprehensive logging to ensure data integrity and accuracy.

FIG. 2, by way of non-limiting disclosure, depicts a detailed and structured overview of the data flow within the Smart Gatekeeper for Data Certainty system, specifically focusing on the steps involved in processing an NDM (Network Data Mover) Batch Message Processing (BMP) file.

NDM is a software tool used to transfer data securely and efficiently between different systems and platforms within a network. NDM ensures reliable data movement, often used in mainframe environments for handling large volumes of data transfers. It supports the scheduling, monitoring, and management of data transfers, making sure that files are moved accurately and on time between source and destination systems. In the context of the Smart Gatekeeper for Data Certainty, NDM is used to transfer Batch Message Processing (BMP) files from various sources to the Gatekeeper Landing Zone for further processing.

The process initiates with the Data Distribution Service (DDS) provisioning an NDM BMP file (Step 200). This file is a batch message processing file that includes several types of records essential for data validation and transaction management. The three types of records received for each entity-level BMP file include:

a. The "Header" file (200A), which marks the start of the session. This file typically contains metadata and initial information about the batch, such as the source of the data, timestamps, and other relevant session-start details.

b. The "Trailer" file (200B), which marks the end of the session. This file includes summary information, such as the total number of records processed, checksums, and other end-of-session details that ensure the integrity of the data processed during the session.

c. The "Detail" file (200C), which contains the raw data that needs to be processed by the Gatekeeper-TMRA (Transaction Manager Resource Adapter). This file holds the main transactional data that will be subjected to further processing and validation.

Once these records are received, the system maps the data to the appropriate topic (Step 202). This mapping ensures that each segment of the BMP file is correctly categorized and routed for processing based on its type (header, trailer, or detail).

In the context of the Gatekeeper data flow, "topics" refer to specific categories or subjects within the data that the Gatekeeper processes and handles separately. Topics are used to organize and manage different types of data records that are processed by the Gatekeeper, ensuring that each type of data is handled appropriately according to its specific requirements.

For example, within the Gatekeeper system, the data might be categorized into different topics such as "Detail," "Header," and "Trailer." Each topic represents a different segment or type of information within the BMP file. The "Detail" topic contains the raw data that needs to be processed, the "Header" topic contains metadata or initial information about the data file, and the "Trailer" topic signifies the end of the data session and might contain summary information or final records.

By categorizing data into topics, the Gatekeeper can process each segment independently and apply specific validation, transformation, and reconciliation steps tailored to each type of data. This approach helps in maintaining organized and efficient data processing, ensuring that each piece of data is accurately handled according to its category.

Next, the Gatekeeper reads the file (Step 204). During this step, the system ingests the BMP file and prepares it for validation. The Gatekeeper then performs a series of validation checks on the data (Step 206). These checks include verifying the data structure, ensuring that all required fields are present, checking for data integrity, and identifying any duplicates or anomalies.

If the validation is successful, the system initiates the Gatekeeper-TMRA process (Step 208). This initiation marks the transition from preliminary data handling to detailed transaction processing. The TMRA reads the file (Step 210), extracting the raw data from the "Detail" file and preparing it for transaction management.

The TMRA then shreds the data, breaking it down into individual transactions that can be processed by the FAST Information Management System (IMS) (Step 212). This step involves invoking the necessary IMS transactions, which execute the financial or data operations required by the incoming data. Each transaction is carefully managed to ensure accuracy and completeness.

Following the transaction processing, the system enters the reconciliation phase. During this phase, the processed data is reconciled to ensure that all transactions have been executed correctly and that the data remains consistent and reliable. The results of this reconciliation are logged to Splunk (Step 214), a platform used for monitoring, searching, analyzing, and visualizing machine-generated big data. Logging to Splunk ensures that all activities are recorded in detail, providing a comprehensive audit trail that can be used for troubleshooting, compliance, and performance analysis.

In the context of the Gatekeeper data flow, Global Traffic Management (GTM) is utilized. GTM targets locations where a specific port is active, ensuring that network traffic is efficiently directed to the most suitable servers. This targeting helps optimize data processing and resource utilization by routing traffic to servers that are currently available and capable of handling the load.

The automation of this process ensures that IMS (Information Management System) instances or ports are only active in one site at a time. This means that, at any given moment, only one data center or server location has an active instance of the IMS application running on a particular port. This strategy prevents conflicts and ensures that data is consistently processed in a controlled and predictable manner.

Various GKC processing, interfaces, and reports can be utilized in as part of the Smart Gatekeeper for Data Certainty system, ensuring precise and efficient data processing.

One is the "Start of Session," which marks the initial phase of the workflow. During this phase, the system begins by consuming data from the incoming file, reading its contents, and preparing them for further processing. Following this, the Gatekeeper validates the data, checking for any duplicates or inconsistencies to ensure that the data is unique and complies with the required standards. After validation, the system updates the Gatekeeper Control Database (GKC DB) with the file's metadata and status, logging information such as the file's arrival time, validation status, and any errors or warnings encountered.

Another is the "End of Session," which signifies the conclusion of the data processing session. During this phase, the system consumes any remaining data from the file, ensuring all data is processed. It then updates the GKC DB with the final status of the file, including any additional information gathered during the end-of-session processing. If the data is validated and no errors are found, the system initiates the Gatekeeper Realtime Management System (GR-RTMS), ensuring the processed data is available for real-time applications and further processing as needed.

A third is the Transaction Manager Resource Adapter (TMRA). In this phase, the system consumes data from a specific topic, which includes detailed transaction records that need processing. The TMRA shreds the data into individual transactions and invokes the necessary transaction processes on the FAST Information Management System (IMS). Each transaction is processed, and the responses are logged, ensuring all transactions are executed accurately and efficiently, with a detailed log of each transaction's outcome.

A fourth is reconciliation, which is the final step in the data processing workflow, ensuring all processed data is consistent and accurate. During this phase, the system writes detailed logs to Splunk, a platform used for searching, monitoring, and analyzing machine-generated data. Additionally, the system updates the FAST BMP (Batch Message Processing) metrics, providing a comprehensive overview of the data processing activities. This ensures that all actions are recorded for auditing, troubleshooting, and performance analysis, maintaining high data integrity and reliability. Overall, the Gatekeeper processing, interfaces, and reports are designed to ensure data is processed accurately, efficiently, and securely, with detailed logs and metrics maintained for auditing and analysis purposes. This comprehensive approach enhances data integrity, reliability, and transparency within the Smart Gatekeeper system.

Thus, FIG. 2 encapsulates the steps involved in ensuring that data is accurately read, validated, processed, and logged by the Smart Gatekeeper system. This detailed flow maintains the integrity and reliability of the information handled, addressing data consistency, error detection, and transaction management in a structured and efficient manner.

By limiting IMS activity to a single site, the system can avoid data inconsistencies and synchronization issues that might arise if multiple sites were processing the same data simultaneously. This setup enhances data integrity and reliability, as well as simplifying the management and monitoring of the system. Automation plays a crucial role by continuously monitoring the system's state and dynamically activating or deactivating IMS instances and ports as needed, based on real-time conditions and workloads.

Figure 3:
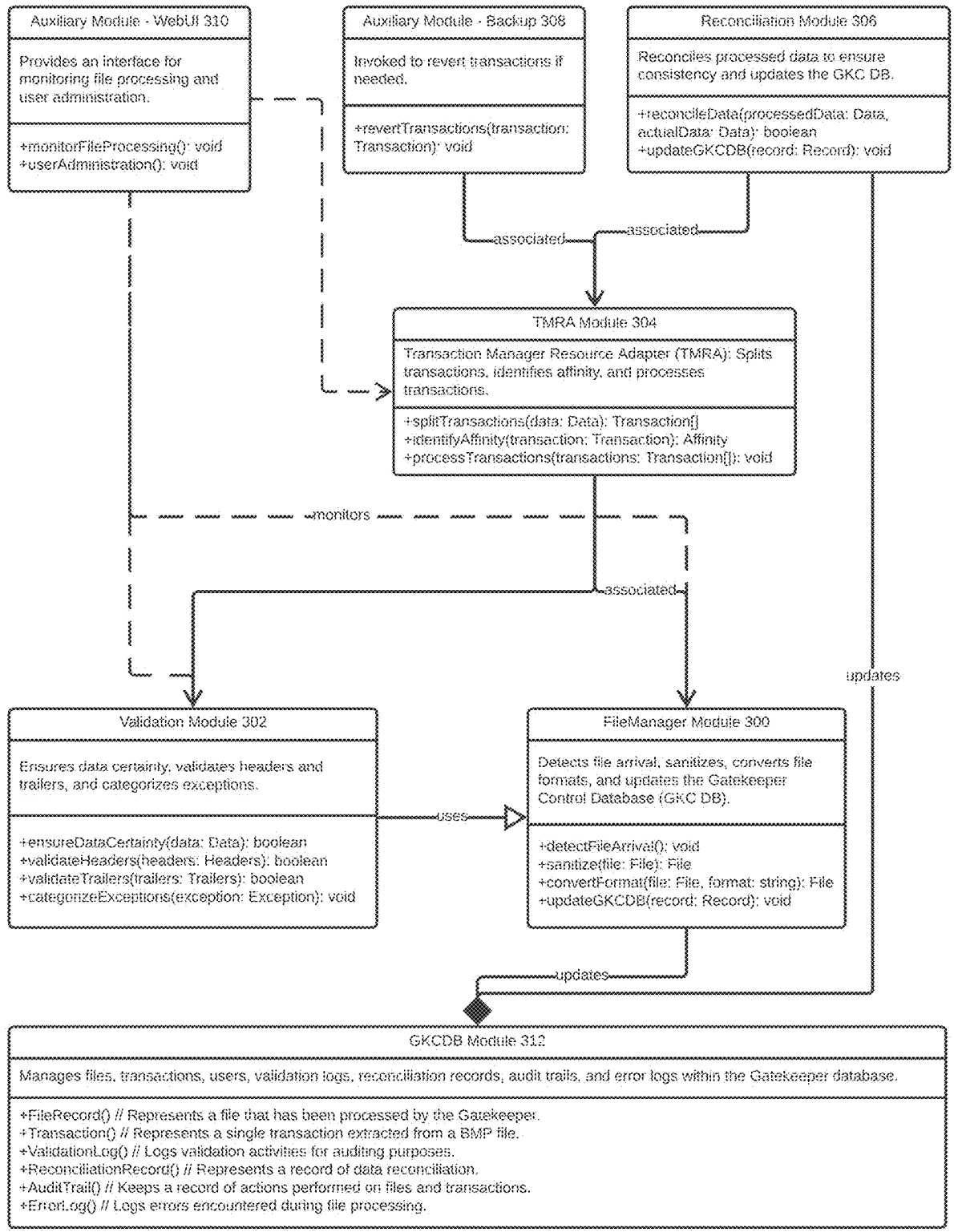
FIG. 3 illustrates a sample class diagram of the Smart Gatekeeper for Data Certainty system, highlighting the interactions between various modules responsible for managing file processing, validation, transaction handling, reconciliation, and user interface functionalities. Each module includes specific methods and attributes that ensure comprehensive management of data integrity and security throughout the entire data processing workflow.

FIG. 3, by way of non-limiting disclosure, depicts a sample class diagram of the Smart Gatekeeper for Data Certainty system, illustrating the interactions between various modules responsible for managing file processing, validation, transaction handling, reconciliation, and user interface functionalities.

The FileManager Module (300) is responsible for detecting the arrival of files, sanitizing them, converting file formats, and updating the Gatekeeper Control Database (GKC DB). It includes several key methods:
- a. detectFileArrival( ) void—This method detects when a new file arrives in the system.
- b. +sanitize (file: File): File—This method sanitizes the incoming file to remove any harmful or corrupt elements.
- c. +convertFormat (file: File, format: string): File—This method converts the file to the required format.
- d. +updateGKCDB (record: Record): void—This method updates the GKC DB with the file's metadata and status after processing.

The Validation Module (302) ensures data certainty by validating the headers and trailers of files and categorizing any exceptions found during validation. Its methods include:
- a. +ensureDataCertainty (data: Data): boolean—This method ensures that the data meets all required standards for certainty.
- b. +validateHeaders (headers: Headers): boolean—This method validates the headers of the file to check for correctness and completeness.
- c. +validateTrailers (trailers: Trailers): boolean—This method validates the trailers of the file to ensure they meet the required specifications.
- d. +categorizeExceptions (exception: Exception): void—This method categorizes any exceptions encountered during the validation process for further action.

The Transaction Manager Resource Adapter (TMRA) Module (304) splits transactions, identifies their affinity, and processes them. Its methods involve:
- a. +splitTransactions (data: Data): Transaction[ ]—This method splits the data into individual transactions.
- b. +identifyAffinity (transaction: Transaction): Affinity—This method identifies the affinity of each transaction to determine the appropriate processing path based on geographic or system load factors.
- c. +processTransactions (transactions: Transaction[ ]): void—This method processes the transactions, ensuring they are executed correctly within the system.

The Reconciliation Module (306) reconciles processed data to ensure consistency and updates the GKC DB. This module includes methods for:
- a. +reconcileData (processedData: Data, actualData: Data): boolean—This method reconciles the processed data with the actual data to ensure consistency and correctness.
- b. +updateGKCDB (record: Record): void—This method updates the GKC DB with reconciliation results, ensuring that all records reflect the current state of the data.

The Auxiliary Module-Backup (308) is invoked to revert transactions if needed. It provides a method:
- a. +revertTransactions (transaction: Transaction): void—This method reverts transactions to their previous state if an error occurs during processing, maintaining data integrity.

The Auxiliary Module—WebUI (310) provides an interface for monitoring file processing and user administration. Its methods include:
- a. +monitorFileProcessing( ) void—This method allows administrators to monitor the processing of files within the system.
- b. +userAdministration( ) void—This method manages user accounts and permissions, ensuring that only authorized users can access and modify system data.

The Gatekeeper Control Database (GKCDB) Module (312) manages various records related to files, transactions, validation logs, reconciliation records, audit trails, and error logs within the system. It includes several classes:
- a. +FileRecord( )—Represents a file that has been processed by the Gatekeeper. It includes attributes such as file ID, file name, status, date received, and date processed, along with methods for updating the status of the file.
- b. +Transaction( )—Represents a single transaction extracted from a BMP file. It includes attributes like transaction ID, file ID, transaction type, amount, and date, with methods for validating the transaction.
- c. +ValidationLog( )—Logs validation activities for auditing purposes. It includes attributes such as log ID, file ID, transaction ID, validation type, result, and timestamp, along with methods for logging validation activities.
- d. +ReconciliationRecord( )—Represents a record of data reconciliation. It includes attributes like record ID, file ID, discrepancies, and reconciliation date, with methods for performing reconciliation.
- e. +AuditTrail( )—Keeps a record of actions performed on files and transactions. It includes attributes such as audit ID, user ID, action, file ID, and timestamp, with methods for recording actions.
- f. +ErrorLog( )—Logs errors encountered during file processing. It includes attributes such as error ID, file ID, error message, and timestamp, with methods for logging errors.

The diagram illustrates the interactions and associations between these modules. For instance, the FileManager module updates the GKCDB with file records, and the Validation module uses the GKCDB to log validation activities. The TMRA module processes transactions and updates the GKCDB, while the Reconciliation module ensures data consistency and logs the reconciliation results in the GKCDB. The Auxiliary modules (Backup and WebUI) interact with these core modules to provide additional functionality, such as transaction reversion and user interface capabilities. This structured approach ensures comprehensive management of data processing, validation, transaction handling, and auditing within the Smart Gatekeeper system.

Figure 4:
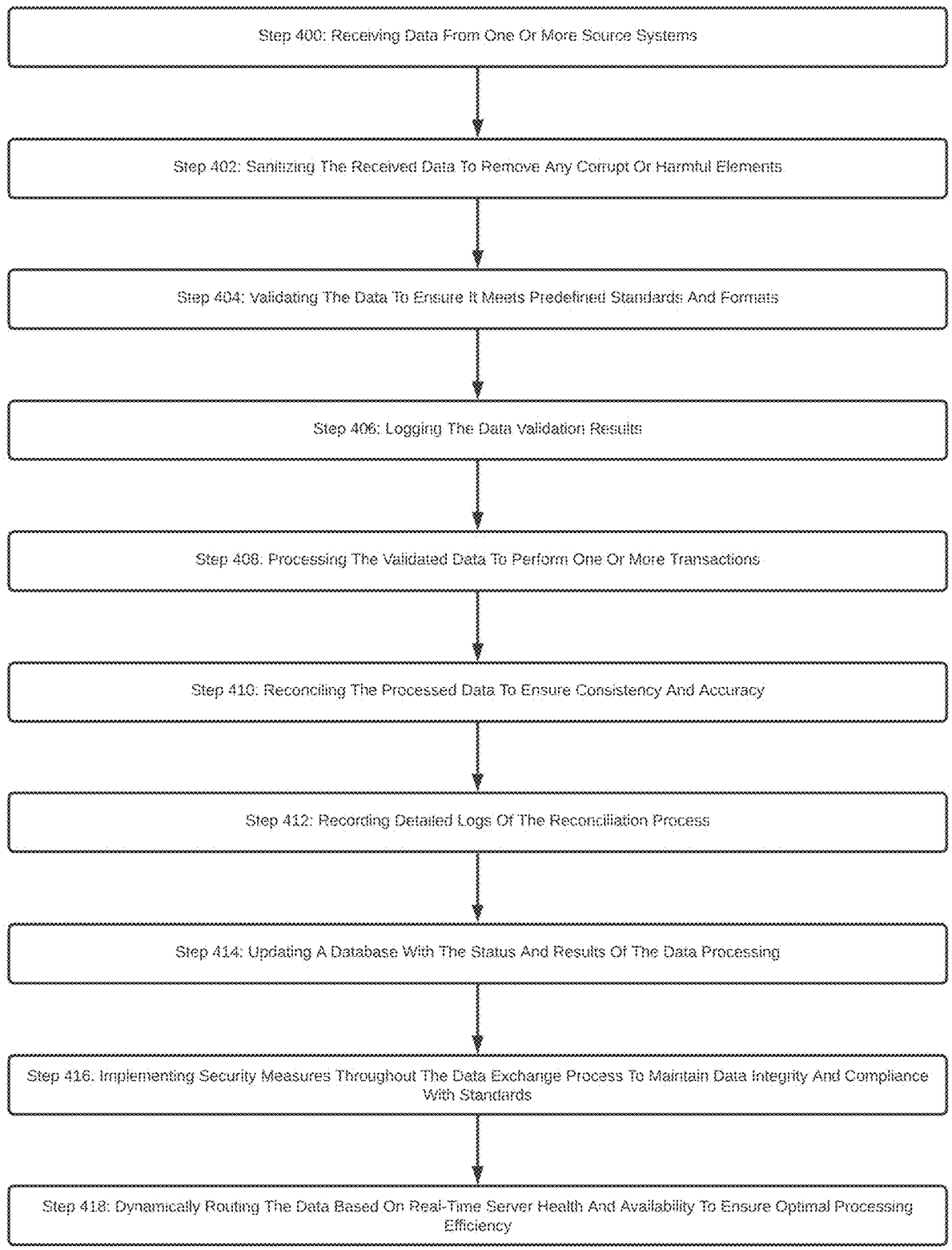
FIG. 4 illustrates a sample method for ensuring the integrity and security of data exchanges between different systems, detailing steps from receiving and sanitizing data to validation, logging, processing transactions, reconciliation, and implementing security measures. The figure also highlights dynamic data routing based on real-time server health to optimize processing efficiency.

FIG. 4, by way of non-limiting disclosure, depicts a detailed method for ensuring the integrity and security of data exchanges between different systems. This method is designed to address the needs of modern data management by implementing a comprehensive workflow that includes data receipt, sanitization, validation, logging, processing, reconciliation, and security measures. Each step in this method is carefully designed to maintain data integrity, security, and compliance with predefined standards.

In Step 400, the method begins with receiving data from one or more source systems. This step involves aggregating data from various origins, which could include different departments, external partners, or other data-generating systems. The ability to handle multiple source systems ensures that the method can integrate and manage diverse data inputs, providing a centralized entry point for further processing.

In Step 402, the received data is sanitized to remove any corrupt or harmful elements. This sanitization process involves scanning the data for malware, corrupt segments, or any other harmful elements that could compromise the integrity of the data or the system. By ensuring that the data is clean before it is processed further, this step protects the system from potential threats and maintains the overall quality of the data.

In Step 404, the data undergoes validation to ensure it meets predefined standards and formats. The validation process checks the data against established criteria to confirm that it is correctly structured and adheres to the necessary quality and compliance standards. This step is crucial for maintaining the consistency and reliability of the data, as it identifies and flags any discrepancies or errors that need to be addressed.

The results of the data validation are logged in Step 406. This logging process records the outcomes of the validation activities, including any errors or issues encountered. The detailed logs provide a comprehensive record that can be used for auditability, troubleshooting, and improving future data processing activities. Maintaining detailed logs is essential for ensuring transparency and accountability in the data management process.

Following validation, the validated data is processed to perform one or more transactions in Step 408. This step involves executing the necessary operations on the data, which could include financial transactions, data transformations, or other types of processing required by the system's workflow. The processing step ensures that the data is utilized effectively to achieve the desired outcomes.

To ensure consistency and accuracy, Step 410 involves reconciling the processed data. This reconciliation process compares the processed data against the original data to verify that all transactions were executed correctly and that there are no discrepancies. The reconciliation step maintains data integrity, as it ensures that the final data set is accurate and reliable.

Detailed logs of the reconciliation process are recorded in Step 412. These logs provide a comprehensive record of the reconciliation activities, including any discrepancies found and the actions taken to resolve them. The reconciliation logs are essential for auditing purposes, as they provide evidence of the reconciliation activities and help ensure compliance with regulatory requirements.

Step 414 updates a database with the status and results of the data processing. This update ensures that the database reflects the current state of the data and transactions, maintaining an accurate and up-to-date record of all processing activities. Keeping the database updated is crucial for maintaining the integrity and reliability of the data management system.

Throughout the entire process, security measures are implemented in Step 416 to maintain data integrity and compliance with standards. These security measures include encryption, access controls, and other protective mechanisms designed to safeguard the data from unauthorized access and ensure that it adheres to regulatory requirements. Implementing robust security measures is essential for protecting sensitive data and maintaining trust in the data management system.

Finally, in Step 418, the data is dynamically routed based on real-time server health and availability to ensure optimal processing efficiency. This dynamic routing ensures that the data is processed by the most reliable and available servers, maximizing the system's performance and resilience. By continuously monitoring server health and adjusting the routing of data accordingly, the system can maintain high levels of efficiency and reliability, even in the face of changing conditions.

This comprehensive method ensures that data exchanges are secure, accurate, and efficient. By integrating multiple steps, including data receipt, sanitization, validation, logging, processing, reconciliation, and security measures, the method addresses the needs of modern data management systems. The dynamic routing of data based on real-time server health further enhances the system's performance, making it a robust solution for managing complex data exchanges between different systems.

Figure 5:
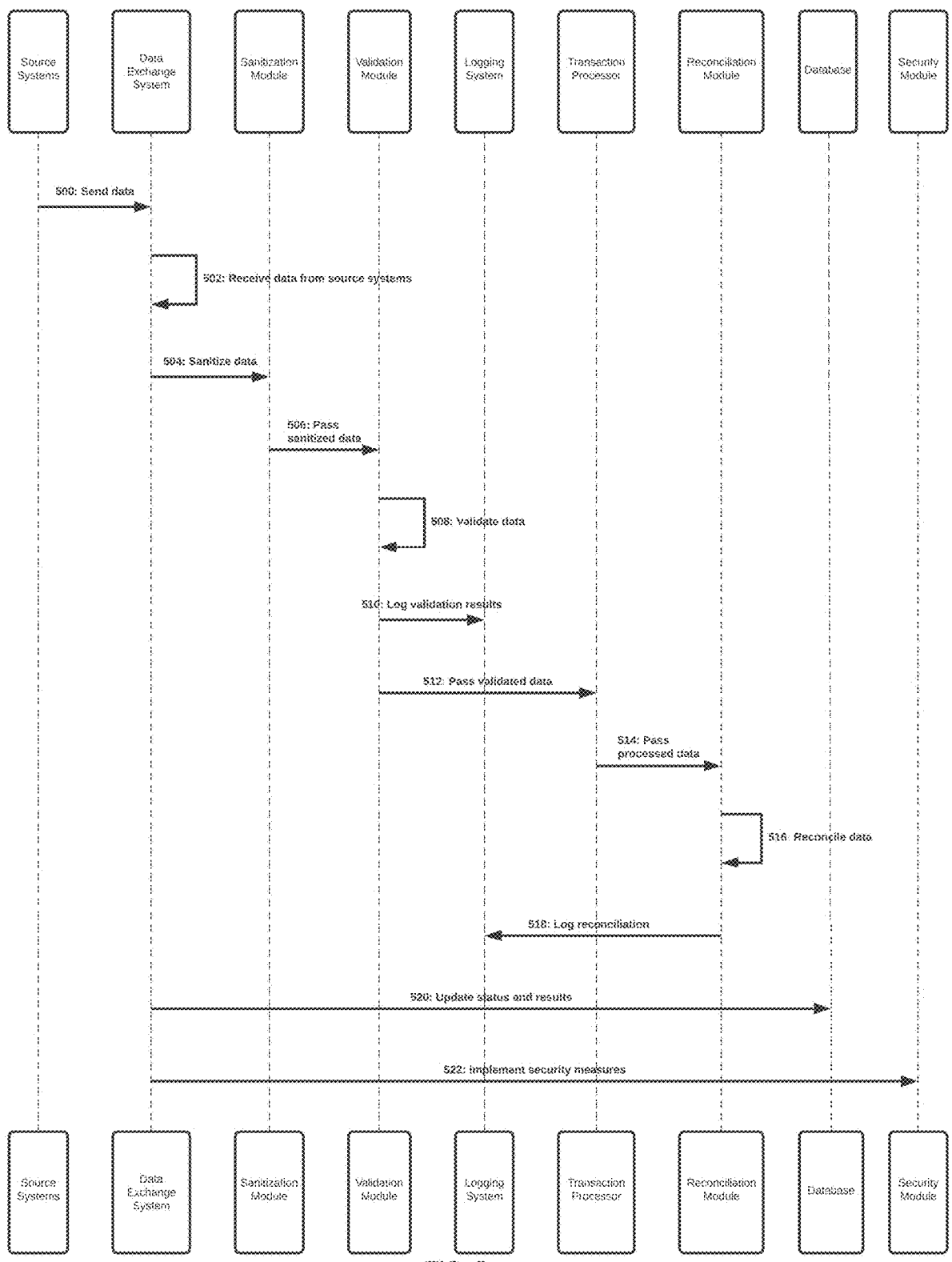
FIG. 5 illustrates a method for ensuring the integrity and security of data exchanges between different systems, detailing steps from receiving and sanitizing data to validation, logging, processing transactions, reconciliation, and implementing security measures.

FIG. 5, by way of non-limiting disclosure, depicts a sequence diagram for a comprehensive method for ensuring the integrity and security of data exchanges between different systems. The process is initiated when the Source Systems send data to the Data Exchange System. This initial step, labeled as Step 500, begins the data exchange process by transferring data from various originating systems to a centralized processing system designed to handle and manage the incoming data efficiently.

Upon receiving the data, the Data Exchange System aggregates data from one or more source systems, as detailed in Step 502. This step ensures that the system can manage and integrate data from diverse sources, which may include different departments, external partners, or various data-generating systems. By centralizing the data intake, the system lays the groundwork for consistent and streamlined data processing.

Once the data is aggregated, the Sanitization Module comes into play. In Step 504, the Sanitization Module sanitizes the received data to remove any corrupt or harmful elements. This process involves scanning the data for malware, corrupt segments, and other harmful elements that could compromise the integrity of the data or the security of the system. This step is essential for protecting the system from potential threats and ensuring that only clean, reliable data proceeds to the next stages of processing.

After sanitization, the sanitized data is passed to the next processing stage, as indicated in Step 506. This transition ensures that only data that has been thoroughly cleaned and verified moves forward in the workflow, maintaining the overall quality and integrity of the data processing pipeline.

In Step 508, the Validation Module validates the data to ensure it meets predefined standards and formats. This step involves checking the data against established criteria to confirm that it is correctly structured and adheres to necessary quality and compliance standards. The validation process is provides for identifying and flagging any discrepancies or errors that need to be addressed before the data can be used in further processing.

The results of the data validation are then logged in the Logging System, as detailed in Step 510. This logging process provides a comprehensive record of the validation activities, including any issues encountered during validation. Maintaining detailed logs is essential for auditability, transparency, and troubleshooting, as it allows for a clear understanding of the data validation process and any problems that may have arisen.

Once validated, the data is passed to the Transaction Processor in Step 512. The Transaction Processor is responsible for processing the validated data to perform one or more transactions, as outlined in Step 514. This step involves executing the necessary operations on the data, which could include financial transactions, data transformations, or other types of processing required by the system's workflow. This step ensures that the data is utilized effectively to achieve the desired outcomes.

To ensure the processed data's consistency and accuracy, the Reconciliation Module performs reconciliation in Step

516. This reconciliation process involves comparing the processed data against the original data to verify that all transactions were executed correctly and that there are no discrepancies. This step provides for maintaining data integrity, as it ensures that the final data set is accurate and reliable.

The Reconciliation Module also records detailed logs of the reconciliation process in the Logging System, as shown in Step 518. These logs provide a comprehensive record of the reconciliation activities, including any discrepancies found and the actions taken to resolve them. The reconciliation logs are essential for auditing purposes, as they provide evidence of the reconciliation activities and help ensure compliance with regulatory requirements.

Following reconciliation, the Data Exchange System updates the database with the status and results of the data processing in Step 520. This update ensures that the database reflects the current state of the data and transactions, maintaining an accurate and up-to-date record of all processing activities. Keeping the database updated is crucial for maintaining the integrity and reliability of the data management system.

Throughout the entire process, the Security Module implements security measures to maintain data integrity and compliance with standards, as detailed in Step 522. These security measures include encryption, access controls, and other protective mechanisms designed to safeguard the data from unauthorized access and ensure that it adheres to regulatory requirements. Implementing robust security measures is essential for protecting sensitive data and maintaining trust in the data management system.

This sequence ensures that the data exchange process is secure, accurate, and compliant with predefined standards. Each step is designed to maintain data integrity and security, providing a robust framework for managing data exchanges between different systems. By integrating multiple steps, including data receipt, sanitization, validation, logging, processing, reconciliation, and security measures, the method addresses the critical needs of modern data management systems. This comprehensive approach ensures that data is handled efficiently and securely at every stage of the process.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A computer-implemented system for managing, validating, securing, and ensuring integrity of data exchanges between a mainframe system and external channels, the system comprising one or more processors and memory storing instructions that, when executed by the one or more processors, cause the system to:
   a Data Distribution Service (DDS) configured to receive files from various channels;
   a Network Data Mover (NDM) configured to route the files to a Gatekeeper Landing Zone (GK LZ);
   a File Manager module configured to:
      detect arrival of new files at the GK LZ,
      perform initial sanitization to check for any corruption,
      create a landed file record in a Gatekeeper Control Database (GKC DB),
      perform supplemental file sanitization to ensure the files are free from harmful elements,
      convert the files from Extended Binary Coded Decimal Interchange Code (EBCDIC) to American Standard Code for Information Interchange (ASCII) format,
      move both the original EBCDIC files and the converted ASCII formatted files into an "In Process" folder, and
      update status and date of the files in the GKC DB;
   a Validation module configured to:
      validate header and trailer fields in converted CSV files to ensure data structure compliance,
      check for duplicate files and handle duplicates appropriately, and
      insert validated files into the Gatekeeper and approve them to proceed;
   a Transaction Manager Resource Adapter (TMRA) module configured to:
      split the data into individual transactions,
      identify affinity routing for each transaction to determine an appropriate system for processing based on geographic location or system load,
      convert the data back from ASCII to EBCDIC, and
      invoke relevant transaction codes to initiate financial transactions within a Financial Authorization System (FAST);
   a Reconciliation module configured to:
      reconcile processed data to ensure consistency and accuracy by comparing the processed results with the original data,
      update the status and date of the reconciled data in the GKC DB, and
      record detailed logs;
   a Backout module configured to initiate a backout process to reverse transactions upon detecting discrepancies during reconciliation;
   a security and validation mechanism configured to maintain data validation and security measures throughout the process to ensure data integrity and compliance with necessary standards;
   an infrastructure configured to ensure continuous operation across multiple data centers using server health checks and URL-based routing to manage file transfers; and
   an audit and logging mechanism configured to provide a comprehensive audit and logging capability to facilitate audits and ensure transparency of all data processing activities.

2. The computer-implemented system of claim 1, wherein the Network Data Mover (NDM) further comprises a server health check module configured to continuously monitor the health of servers and dynamically route files to the most reliable and available servers based on real-time conditions.

3. The computer-implemented system of claim 2, wherein the File Manager module further comprises a sanitization engine that performs both initial and supplemental sanitization by scanning for and removing potential malware, corrupt data segments, and other harmful elements from the files.

4. The computer-implemented system of claim 3, wherein the Validation module further includes a rules engine that dynamically applies data governance rules to ensure headers and trailers of the files conform to predefined standards and formats.

5. The computer-implemented system of claim 4, wherein the Validation module is configured to log any validation exceptions and errors in the Gatekeeper Control Database (GKC DB) and categorize these exceptions for further analysis and troubleshooting.

6. The computer-implemented system of claim 5, wherein the Transaction Manager Resource Adapter (TMRA) module further includes a transaction affinity analyzer that determines an optimal processing path for each transaction based on geographic location, current system load, and processing requirements.

7. The computer-implemented system of claim 6, wherein the TMRA module is also configured to perform batch processing of transactions in response to the system detecting a high volume of transactions, ensuring efficiency and timeliness in transaction processing.

8. The computer-implemented system of claim 7, wherein the Reconciliation module further comprises a detailed transaction comparison tool that verifies the consistency and accuracy of processed data against original data by using checksum and other integrity verification techniques.

9. The computer-implemented system of claim 8, wherein the Backout module includes a rollback mechanism that automatically initiates a backout process for transactions that fail reconciliation, ensuring data integrity is maintained.

10. The computer-implemented system of claim 9, wherein the security and validation mechanism includes an externalized data governance framework that allows for the real-time updating and application of security policies and validation rules to adapt to emerging threats and compliance requirements.

11. The computer-implemented system of claim 10, further comprising a comprehensive monitoring and alert system integrated with the audit and logging capability, providing real-time alerts and detailed audit trails for all data processing activities to facilitate rapid response to any anomalies or security breaches.

12. A computer-implemented method for managing, validating, securing, and ensuring integrity of data exchanges between a mainframe system and external channels, the method performed by one or more processors of a computer system and comprising the steps of:
  receiving files from various channels via a Data Distribution Service (DDS);
  routing the files to a Gatekeeper Landing Zone (GK LZ) using a Network Data Mover (NDM), wherein the NDM dynamically routes files based on real-time server health and availability;
  detecting arrival of new files at the GK LZ using a File Manager module and performing initial sanitization to remove any corrupt or harmful elements from the files;
  creating a landed file record in a Gatekeeper Control Database (GKC DB) to track file progress and status;
  performing supplemental sanitization on the files to ensure they are free from any residual harmful elements;
  converting the files from Extended Binary Coded Decimal Interchange Code (EBCDIC) to American Standard Code for Information Interchange (ASCII) format to make the data compatible with modern processing systems;
  moving both the original EBCDIC files and the converted ASCII formatted files into an "In Process" folder, while updating the status and date of the files in the GKC DB;
  validating header and trailer fields in converted CSV files using a Validation module to ensure data structure compliance with predefined standards;
  checking for duplicate files and categorizing any exceptions using a rules engine within the Validation module, and logging these exceptions in the GKC DB for further analysis and troubleshooting;
  inserting validated files into the Gatekeeper and approving them to proceed to a next stage of processing;
  initiating a Transaction Manager Resource Adapter (TMRA) process to split the data into individual transactions, distinguishing between debits and credits;
  identifying affinity routing for each transaction to determine an appropriate system for processing based on geographic location, current system load, and processing requirements, ensuring optimal transaction processing efficiency;
  converting the data back from ASCII to EBCDIC and invoking relevant transaction codes to initiate financial transactions within a Financial Authorization System (FAST), ensuring accurate and timely transaction execution;
  reconciling the processed data using a Reconciliation module to ensure consistency and accuracy by comparing the processed results with the original data, utilizing detailed transaction comparison tools such as checksums for integrity verification;
  updating the status and date of the reconciled data in the GKC DB and recording detailed logs of all processing activities to facilitate audits and ensure transparency;
  initiating a backout process using a rollback mechanism in a Backout module to reverse transactions upon detecting discrepancies during reconciliation, maintaining data integrity;
  maintaining rigorous data validation and security measures throughout an entire process by implementing an externalized data governance framework that allows for the real-time updating and application of security policies and validation rules to adapt to emerging threats and compliance requirements;
  ensuring continuous operation across multiple data centers using server health checks and URL-based routing to manage file transfers, thereby minimizing risk of data loss and downtime; and
  providing a comprehensive audit and logging capability integrated with a monitoring and alert system to provide real-time alerts and detailed audit trails of all data processing activities, facilitating rapid response to any anomalies or security breaches.

13. The computer-implemented method of claim 12, further comprising the step of continuously monitoring the health of servers and dynamically updating the routing of files based on current server health and availability using a server health check module within the Network Data Mover (NDM).

14. The computer-implemented method of claim 13, wherein the initial sanitization performed by the File Manager module includes scanning the files for malware, corrupt data segments, and other harmful elements, and removing any detected threats to ensure data integrity.

15. The computer-implemented method of claim 14, further comprising the step of validating the files using a dynamic rules engine within the Validation module, wherein the rules engine applies real-time data governance rules to ensure the headers and trailers of the files conform to predefined standards and formats.

16. The computer-implemented method of claim 15, wherein the Transaction Manager Resource Adapter (TMRA) process includes a transaction affinity analyzer that determines the optimal processing path for each transaction based on geographic location, current system load, and processing requirements to enhance processing efficiency.

17. The computer-implemented method of claim 16, further comprising the step of performing batch processing of transactions in response to the system detecting a high volume of transactions, ensuring efficiency and timeliness in transaction processing.

18. The computer-implemented method of claim 17, wherein the comprehensive audit and logging capability includes a detailed transaction comparison tool that verifies the consistency and accuracy of processed data against original data by using checksums and other integrity verification techniques, and logs these activities in the Gatekeeper Control Database (GKC DB).

19. The computer-implemented method of claim 18, wherein the external channels are online applications performing transaction processing and the mainframe system performs batch processing.

20. A computer-implemented method for ensuring integrity and security of data exchanges between different systems, the method performed by one or more processors of a computer system and comprising the steps of:

receiving data from one or more source systems;

sanitizing the received data to remove any corrupt or harmful elements;

validating the data to ensure it meets predefined standards and formats;

logging the data validation results;

processing the validated data to perform one or more transactions;

reconciling the processed data to ensure consistency and accuracy;

recording detailed logs of the reconciliation process;

updating a database with status and results of the data processing;

implementing security measures throughout a data exchange process to maintain data integrity and compliance with standards; and dynamically routing the data based on real-time server health and availability to ensure optimal processing efficiency.

\* \* \* \* \*